A. Belt's
Churn Dasher.
97859
PATENTED DEC 14 1869
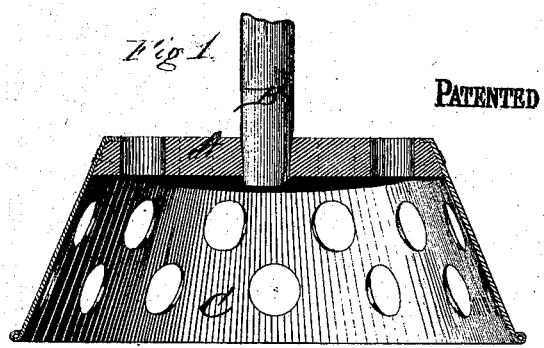
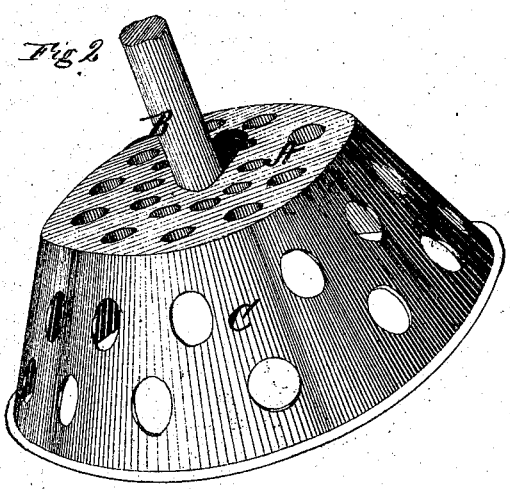
Witnesses
Inventor.
A. Belt.
Alexander Mason
Atty.

United States Patent Office.

A. BELT, OF NEWTON, IOWA.

Letters Patent No. 97,859, dated December 14, 1869.

IMPROVEMENT IN CHURN-DASHERS.

The Schedule referred to in these Letters Patent and making part of the same.

*To all whom it may concern:*

Be it known that I, A. BELT, of Newton, in the county of Jasper, and in the State of Iowa, have invented certain new and useful Improvements in Churn-Dashers; and I do hereby declare that the following is a full, clear, and exact description thereof, reference being had to the accompanying drawings, and to the letters of reference marked thereon, making a part of this specification.

The nature of my invention consists in the construction of a "churn-dash," of the shape of an inverted pan, made of any material, larger at the bottom than at the top, with sufficient perforations at both top and sides to thoroughly agitate the milk or cream.

In order to enable others skilled in the art to which my invention appertains, to make and use the same, I will now proceed to describe its construction and operation, referring to the annexed drawings, in which—

Figure 1 is a vertical section, and
Figure 2, a perspective view of my churn-dasher.

A represents the top of the churn-dasher, made of wood, and perforated with any desired number of holes.

In the centre of the top A, is secured the rod or shaft B.

Around the edge of the top A, is placed a rim, C, of tin, extending downward a suitable distance, and being wider at the lower edge than at the top, presenting the appearance of an inverted pan. The rim C is also perforated with any desired number of holes.

The shape of the dasher enables me to get the largest amount of agitation of milk possible.

The upper or wooden portion A being perforated with holes, and the sides of tin also being wider at the bottom, collects a large quantity of milk or cream, and the space contracting as the milk ascends, it is forced out at the perforations in the tin, as well as in the wooden portion, giving the milk a violent agitation, and thereby producing good butter in less time than any other dash; then, for gathering the butter, it excels, and is more easily cleansed than any other dash.

I do not wish to be understood as confining myself to any particular material of which to make my dasher, as it may be made of any other material than above mentioned; although I prefer to make the upper part of the dash of wood, to give it strength and durability, and the lower part of tin, to make it light, and easily handled while churning.

Having thus fully described my invention,

What I claim as new, and desire to secure by Letters Patent, is—

The within-described churn-dasher, formed of an inverted pan-shaped metal piece, C, perforated and connected to horizontal perforated wood piece A, and connected to the staff B, all as shown and described.

In testimony that I claim the foregoing, I have hereunto set my hand, this 7th day of October, 1869.

A. BELT.

Witnesses:
J. A. HAMMER,
F. W. COZAD.